US008699301B2

(12) United States Patent
Alkhalifah et al.

(10) Patent No.: US 8,699,301 B2
(45) Date of Patent: Apr. 15, 2014

(54) APPARATUS AND SYSTEM FOR ACQUIRING SEISMIC DATA OVER A LOOSE SURFACE

(75) Inventors: Tariq Ali Alkhalifah, Riyadh (SA); Hashim Sari Almalki, Riyadh (SA); Fahad Mohammed Almalki, Riyadh (SA); Sajjad Ali Muhammad Khan Syed, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 703 days.

(21) Appl. No.: 12/954,592

(22) Filed: Nov. 24, 2010

(65) Prior Publication Data

US 2012/0127828 A1  May 24, 2012

(51) Int. Cl.
*G01V 1/16* (2006.01)
(52) U.S. Cl.
CPC ............... *G01V 1/166* (2013.01); *G01V 1/162* (2013.01); *Y10S 181/401* (2013.01)
USPC ............ 367/177; 367/188; 181/122; 181/401

(58) Field of Classification Search
USPC .................... 367/177, 178, 188; 181/122, 401
See application file for complete search history.

(56) References Cited

U.S. PATENT DOCUMENTS 3,930,219 A * 12/1975 Kostelnicek .................. 367/177
3,934,218 A * 1/1976 Babb .............................. 367/177
5,747,754 A * 5/1998 Svenning et al. .............. 367/17

* cited by examiner

*Primary Examiner* — Ian J Lobo
(74) *Attorney, Agent, or Firm* — Timberline Patent Law Group PLLC (57) ABSTRACT

An apparatus and system for acquiring seismic data over a loose surface is disclosed. The apparatus includes a housing capable of moving on the loose surface with an opening configured at a bottom surface of the housing. The apparatus further includes a seismic sensing unit configured within the housing at an angle with respect to a horizontal plane. The horizontal plane may be the bottom surface of the housing. The seismic sensing unit is operable to retractably move within the housing towards and away from the opening. In response to the seismic sensing unit moving towards the opening, the seismic sensing unit establishes contact with the loose surface for acquiring the seismic data.

16 Claims, 9 Drawing Sheets

APPARATUS AND SYSTEM FOR ACQUIRING SEISMIC DATA OVER A LOOSE SURFACE

FIELD OF THE INVENTION

The present invention generally relates to acquiring seismic data over a surface. More specifically, the present invention relates to an apparatus and system for acquiring seismic data over a loose surface.

BACKGROUND OF THE INVENTION

Seismic data corresponding to a subsurface for an area, for example, in a sand dune, is collected using multiple seismic sensing units that analyze seismic signals reflected from the subsurface. A seismic wave generator may be used to send seismic signals to subsurface. These seismic signals may be reflected and refracted by various layers of the subsurface. The multiple seismic sensing units are generally towed on a surface in the area to collect the seismic data. More specifically, multiple seismic sensing units receive the seismic signals that are reflected and refracted from various layers of the subsurface. These received seismic signals are processed to obtain the seismic data. The multiple seismic sensing units are required to be in contact with the surface for collecting the seismic data. Accordingly, multiple people are required to ensure that the seismic sensing units are in contact with the surface to ensure seismic data are collected efficiently. Further, it is required to ensure that the multiple seismic sensing units move along a substantially uniform path.

In cases, when the surface is a loose surface, it is a challenge to ensure that the multiple seismic sensing units move along a uniform path and that the multiple seismic sensing units are in contact with the loose surface.

Therefore, there is a need for an efficient apparatus and system for collecting seismic data over a loose surface.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily in combinations of apparatus components related to apparatus and system for acquiring seismic data over a loose surface. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Various embodiments of the invention provide an apparatus for acquiring seismic data over a loose surface. Examples of the loose surface may include, but are not limited to, a sand dune surface, a gravel sediment surface, a free sand surface, a soft soil surface and a snow surface. The apparatus includes a housing capable of moving on the loose surface with an opening configured at a bottom surface of the housing. The apparatus further includes a seismic sensing unit configured within the housing at an angle with respect to a horizontal plane. The horizontal plane may be the bottom surface of the housing. The seismic sensing unit is operable to retractably move within the housing towards and away from the opening. In response to the seismic sensing unit moving towards the opening, the seismic sensing unit establishes contact with the loose surface for acquiring the seismic data.

Figure 1A:
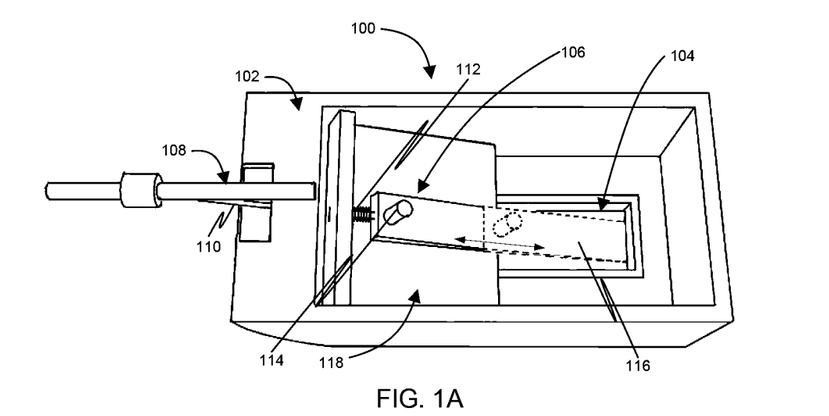
FIG. 1A and FIG. 1B illustrate a perspective view and a side view, respectively, of an apparatus for acquiring seismic data over a loose surface in accordance with an embodiment.
Figure 1B:
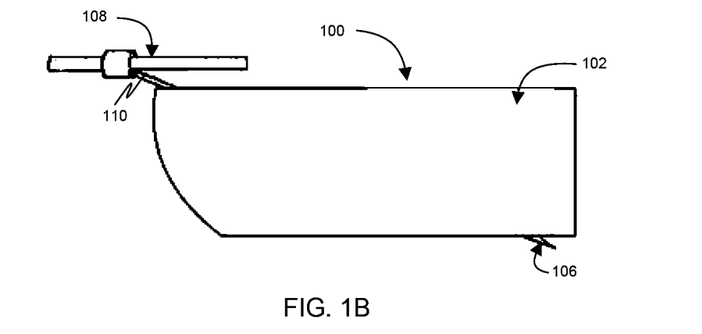

FIG. 1A and FIG. 1B illustrate a perspective view and a side view, respectively, of an apparatus 100 for acquiring seismic data over a loose surface in accordance with an embodiment. Examples of the loose surface may include, but are not limited to, a sand dune surface, a gravel sediment surface, a free sand surface, a soft soil surface and a snow surface. Apparatus 100 includes a housing 102 capable of moving on the loose surface. Housing 102 may have a shape which may be, but is not limited to, rectangular, square, circular and elliptical. Housing 102 may be composed of a lightweight material or any other material known in the art to enable apparatus 100 to move conveniently on the loose surface. Housing 102 is configured with an opening 104 at a bottom surface of housing 100 as illustrated in FIG. 1A. Opening 104 may have a shape which may be, but is not limited to, rectangular, square, circular and elliptical. Apparatus 100 further includes a seismic sensing unit 106 arranged at an angle with respect to a horizontal plane within housing 102. For example, the angle may be greater than 25° and lesser than 45°. However, it may be noted that a seismic sensing unit such as, seismic sensing unit 106 may be arranged in any angle to enable the seismic sensing unit to conveniently operate within a housing. In an embodiment, the horizontal plane may be considered as the bottom surface of housing 102. In this case, seismic sensing unit 106 may be configured at an angle with respect to the bottom surface. Seismic sensing unit 106 is operable to retractably move within housing 102. While retractably moving, seismic sensing unit 106 moves towards and away from opening 104 as illustrated in FIG. 1A. More specifically, when seismic sensing unit 106 reaches the opening, seismic sensing unit 106 protrudes out through opening 104 as illustrated in FIG. 1B. FIG. 1A illustrates the two positions of seismic sensing unit 106 while executing the retractable motion.

In response to seismic sensing unit 106 moving towards opening 104, seismic sensing unit 106 establishes contact with the loose surface for acquiring the seismic data. Seismic sensing unit 106 is operated by a driving unit 108. Thus, driving unit 108 enables seismic unit 106 to perform the retractable movement. Driving unit 108 may include an elongated member 110 connected to seismic unit 106. In an embodiment, elongated member 110 may be for example, but not limited to, a cable, a wire and a rope. Elongated member 110 is manipulated to facilitate the retractable movement of seismic sensing unit 106. For example, elongated member 110 may be pulled to move seismic sensing unit 106 away from opening 104. Conversely, elongated member 110 may be pushed or released to move seismic sensing unit 106 towards opening 104. As a result, seismic sensing unit 106 establishes contact with the loose surface.

When elongated member 110 is manipulated, an elastic mechanism 112 assists elongated member 110 to facilitate the retractable movement of seismic sensing unit 106. In an embodiment, elastic mechanism 112 may be coupled to a portion of elongated member 110. Elastic mechanism 112 may be one of a spring mechanism, a rubber based mechanism, and a resin based mechanism. However, it will be apparent to a person skilled in the art that any other mechanism known in the art may be used as elastic mechanism 112. Elastic mechanism 112 is further explained in conjunction with FIG. 2.

Referring to seismic sensing unit 106, seismic sensing unit 106 gathers seismic data in response to establishing contact with the loose surface. In an embodiment, seismic sensing unit 106 includes one or more geophones, for example, a geophone 114, for gathering the seismic date. However, it will be apparent to a person skilled in the art that a seismic sensing unit such as, seismic sensing unit 106 may include any other sensing devices known in the art other than a geophone that is capable of receiving seismic wave signals.

The one or more geophones may sense a plurality of seismic wave signals reflected from a subsurface corresponding to the loose surface. The plurality of seismic wave signals may be generated by a seismic wave generator (not shown in FIG. 1). The plurality of seismic wave signals may be send to the subsurface of the loose surface. The plurality of seismic wave signals may be reflected and refracted from various layers of the subsurface. These reflected and refracted wave signals are then received by the one or more geophones of seismic sensing unit 106. Thus, the reflected and refracted wave signals may be processed to obtain the seismic data. In an embodiment, seismic sensing unit 106 may process the reflected and refracted wave signals to obtain the seismic data.

In an embodiment, the seismic wave generator may be located in apparatus 100. Alternatively, the seismic wave generator may be located in a vehicle used for pulling apparatus 100.

Seismic sensing unit 106 includes a base unit 116 having a geophone 114 mounted thereon. In an embodiment, base unit 116 may be composed of one or more of one or more metals and one or more alloys. However, it will be apparent to a person skilled in the art that the base unit may be composed of any other material known in the art.

As explained earlier, if seismic sensing unit 106 needs to be configured at the angle with respect to the horizontal plane, a support is provided to seismic sensing unit 106 to achieve the angle. Therefore, apparatus 100 includes a supporting unit 118. Supporting unit 118 may be removably attached to the bottom portion of housing 102. Thereafter, seismic sensing unit 106 may be mounted on supporting unit 118. Supporting unit 118 is further explained in conjunction with FIG. 3 and FIG. 4. Supporting unit 118 may be configured with a drive channel (not shown in the FIG. 1A and FIG. 1B). Seismic sensing unit 106 may be movably mounted on the drive channel so that the retractable movement of seismic sensing unit 106 can be achieved. The drive channel is further explained in conjunction with FIG. 5A and FIG. 5B.

Explaining by way of an example, a seismic sensing unit may establish contact with a loose surface when an apparatus including the seismic sensing unit is located in a first location. In this instance, the seismic unit may acquire seismic data over the first location. Thereafter, the apparatus may be moved to a second location. The apparatus may be moved by pulling an elongated member connected to the seismic sensing unit. When the elongated member is pulled, the seismic sensing unit is pulled back from an opening whereby the contact between the seismic sensing unit and the loose surface is broken. Once the apparatus reaches the second location, the elongated member is released. As a result, the seismic sensing unit moves towards the opening in the apparatus and establishes contact with the loose surface. The seismic sensing unit can then acquire seismic data over the second location. Thus, due the retractable movement of the seismic sensing unit, the apparatus is capable of gathering the seismic data accurately. In this case, the seismic sensing unit also establishes a proper contact with the loose surface for gathering the seismic data. Further, as a proper contact is established, the seismic sensing unit receives a major portion of the plurality of seismic wave signals reflected from the subsurface of the loose surface.

Figure 2:
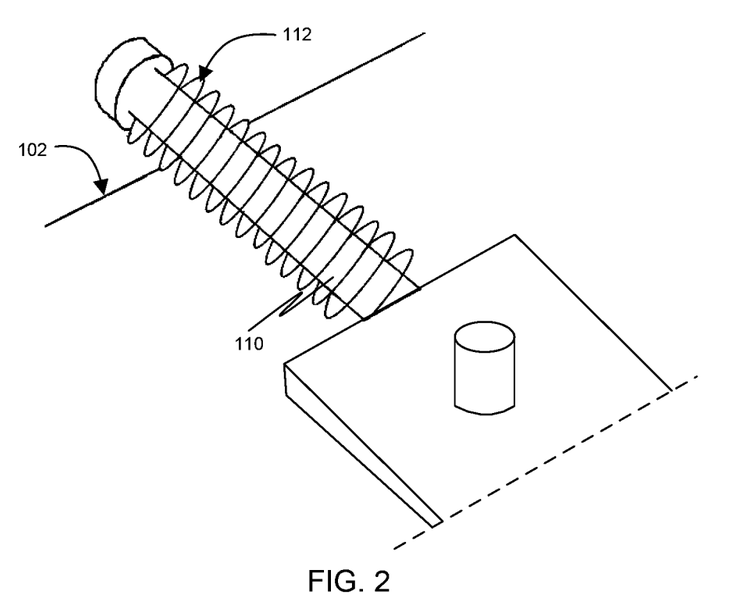
FIG. 2 illustrates a perspective view of an elastic mechanism coupled to a portion of an elongated member in accordance with an embodiment.

As explained earlier, elastic mechanism 112 may be coupled to a portion of elongated member 110 to facilitate the retractable movement of seismic sensing unit 106. FIG. 2 illustrates a perspective view of elastic mechanism 112 coupled to the portion of elongated member 110 in accordance with an embodiment. Elastic mechanism 112 may be wounded on or around a portion of elongated member 110 as illustrated in FIG. 2. In an embodiment, elastic mechanism 112 may be but not limited to a spring mechanism, a rubber based mechanism, a resin-based mechanism. The spring mechanism may be a compression spring mechanism, a helical spring mechanism or any other spring mechanism known in the art.

In an embodiment, a first end (not shown in FIG. 2) of elastic mechanism 112 may be connected to a portion of housing 102 and a second end of elastic mechanism 122 may be connected to a portion of seismic sensing unit 106. Thus, when elongated member 110 is pulled, seismic sensing unit 106 moves away from opening 104 (not shown in FIG. 2), resulting in compression of elastic mechanism 112. Then, when elongated member 110 is released, elastic mechanism 112 expands to facilitate seismic sensing unit 106 to move through opening 104 and establish contact with the loose surface.

Figure 3:
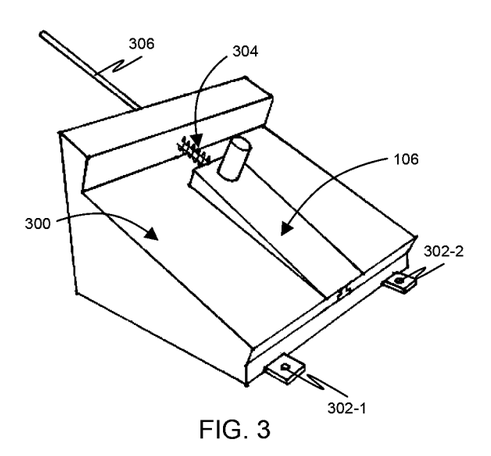
FIG. 3 illustrates a perspective view of a seismic sensing unit mounted on a supporting unit in accordance with an embodiment.
Figure 4:
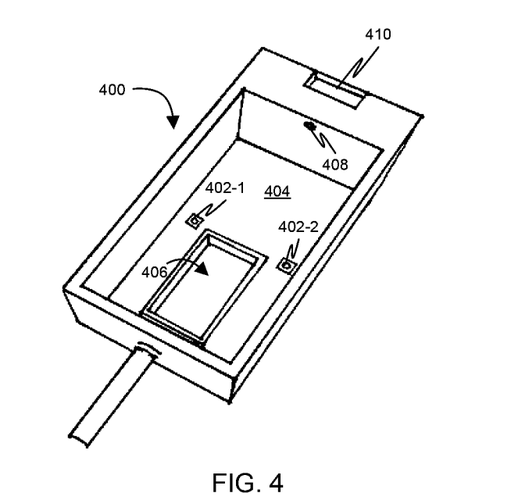
FIG. 4 illustrates a perspective view of a housing configured to receive the supporting unit in accordance with an embodiment.

Now moving to FIG. 3, FIG. 3 illustrates a perspective view of a seismic sensing unit 106 mounted on a supporting unit 300 in accordance with an embodiment. Supporting unit 300 may be configured within a housing, such as housing 102. FIG. 4 illustrates a perspective view of a housing 400, which is more specifically configured to receive supporting unit 300 in accordance with an embodiment.

Supporting unit 300 includes one or more fastening members, for example a fastening member 302-1 and a fastening member 302-2 as illustrated in FIG. 3. Further, housing 400 includes one or more perforations, for example a perforation 402-1, and a perforation 402-2. The one or more perforations may be provided on a bottom surface 404 of housing 400 as illustrated in FIG. 4. To removably couple supporting unit 300 to housing 400, one or more fasteners (not shown in FIG. 3 and FIG. 4) may be used. Accordingly, to arrange supporting unit 300 within housing 400, initially supporting unit 300 is placed within housing 400 such that the one or more fastening members are positioned over the one or more perforations. For example, fastening member 302-1 may be positioned over perforation 402-1. Further, fastening member 302-2 may be positioned over perforation 402-2. Thereafter, the one or more fasteners screwed or passed through the one or more fastening members and the one or more perforations to removably couple supporting unit 300 to housing 400. The one or more fasteners may include for example, but not limited to screws and nuts, nails, rivets and bolts. Further, it will be apparent to a person skilled in the art that any other mechanisms or arrangements known in the art may be used to couple or configure a supporting unit such as, supporting unit 300 within a housing such as, housing 400.

Once supporting unit 300 is configured within housing 400, seismic sensing unit 106 may be mounted on supporting unit 300. More specifically, seismic sensing unit 106 is mounted on a drive channel (not shown in FIG. 3) configured in supporting unit 300. The drive channel enables seismic sensing unit 106 to retractably move on supporting unit 300. Seismic sensing unit 106 needs to be inclined at an angle with respect to the horizontal plane as explained in conjunction with FIG. 1. To achieve this, supporting unit 300 may have at least one surface inclined at an angle with respect to the horizontal plane. In this case, seismic sensing unit 106 may be mounted on the drive channel configured in the inclined surface. In an embodiment, supporting unit 300 may have a wedge shaped cross-section as depicted in FIG. 3. Once seismic sensing unit 106 is mounted on supporting unit 300, seismic sensing unit 106 can retractably move towards an opening 406 of housing 400 conveniently to establish contact with the loose surface. A driving unit 304 may be provided to enable seismic sensing unit 106 to retractably move towards and away from opening 406 as illustrated in FIG. 3.

As explained in conjunction with FIG. 1, driving unit 304 may include an elongated member 306 connected to seismic sensing unit 106. Elongated member 306 may be passed through a perforation 408 (illustrated in FIG. 4) and connected to seismic sensing unit 106. Additionally, a groove 410 (illustrated in FIG. 4) may be provided for facilitating elongated member 306 to be conveniently manipulated for retractably moving seismic sensing unit 106. However, elongated member 306 may pass through-hole provided in the housing for connecting with seismic sensing unit 106. In this case, groove 410 may not be provided in housing 400.

Figure 5A:
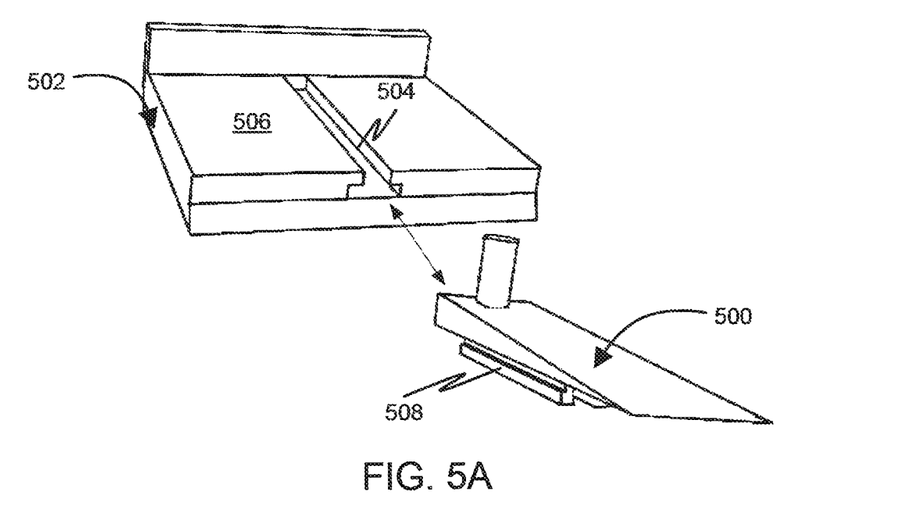
FIG. 5A illustrates an exploded view of a seismic sensing unit mounted on a supporting unit 402 in accordance with an embodiment.
Figure 5B:
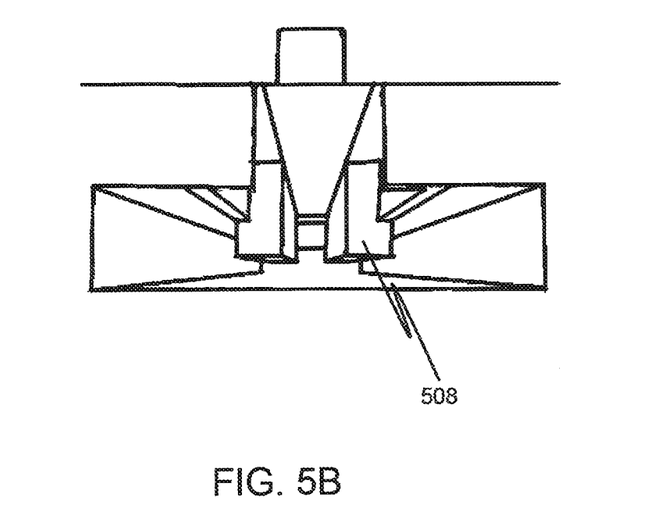
FIG. 5B illustrates a cross-sectional view of the supporting unit in accordance with an embodiment.

FIG. 5A illustrates an exploded view of a seismic sensing unit 500 mounted on a supporting unit 502 having a drive channel 504 in accordance with an embodiment. Further, a side cross-sectional view of drive channel 504 used for movably mounting seismic sensing unit 500 on supporting unit 502 in accordance with an embodiment as illustrated in FIG. 5B. Drive channel 504 is configured in a surface 506 of supporting unit 502. A drive channel such as, drive channel 504 may be composed of but not limited to, a metal and an alloy. However, it will be apparent to a person skilled in the art that the drive channel may be composed of any other suitable material known in the art that facilitates the retractable movement of the seismic sensing unit.

In an embodiment, seismic sensing unit 500 is provided with an engaging member 508 as illustrated in FIG. 5B. More specifically, FIG. 5B illustrates engaging member 508 securely interlocking with drive channel 504 to enable seismic sensing unit 500 to be moveably mounted on supporting unit 502. Accordingly, engaging member 508 slides through drive channel 504 to facilitate the retractable movement of seismic sensing unit 500. An engaging member such as, engaging member 508, may be composed of a metal and/or an alloy. However, it will be apparent to a person skilled in the art that the engaging member may be composed of any other suitable material known in the art that facilitates the retractable movement of the seismic sensing unit.

Further, as engaging member 508 slides through drive channel 504, in an embodiment one or more locking mechanisms (not shown in FIG. 5A and FIG. 5B) may be provided in drive channel 504 to prevent engaging member 508 from disengaging from drive channel 504. The one or more locking mechanisms may be operated manually or automatically. Further, to ensure that seismic sensing unit 500 smoothly moves in drive channel 504 with reduced friction, one or more lubricants may be applied on drive channel 504 and engaging member 508.

Figure 6:
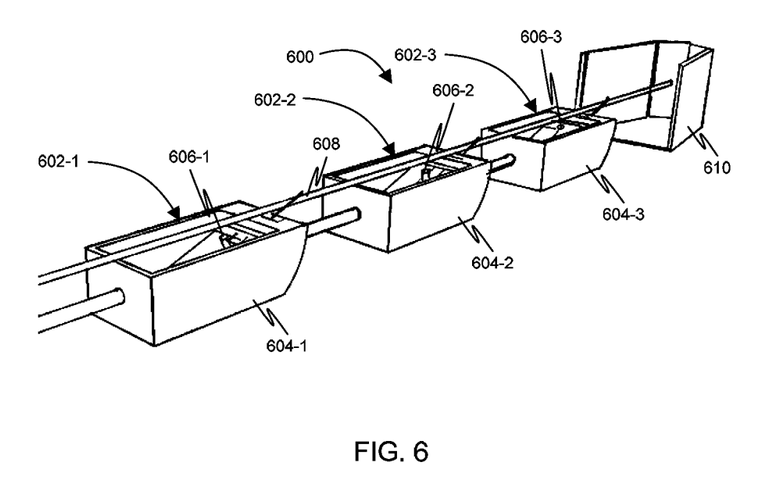
FIG. 6 illustrates a system for performing seismic exploration over a loose surface in accordance with an embodiment.

FIG. 6 illustrates a system 600 for performing seismic exploration over a loose surface in accordance with an embodiment. System 600 includes one or more apparatuses 602-$n$ for acquiring seismic data over the loose surface. Examples of one or more apparatuses 602-$n$ include, but are not limited to an apparatus 602-1, an apparatus 602-2, an apparatus 602-3, an apparatus 602-4, an apparatus 602-5 and an apparatus 602-6. One or more apparatuses 602-$n$ include, one or more housings 604-$n$. For example, apparatus 602-1 may have a housing 604-1. Similarly, apparatus 602-2 and apparatus 602-3 may have a housing 604-2 and a housing 604-3, respectively. One or more housings 604-$n$ are capable of moving on the loose surface. An opening may be configured at a bottom portion of a housing (not shown in FIG. 6) of each apparatus. One or more apparatuses 602-$n$ further includes one or more seismic sensing units 606-$n$, for example a seismic sensing unit 606-1, a seismic sensing unit 606-2, and a seismic sensing unit 606-3. One or more seismic sensing units 606-$n$ are configured within the housing at an angle with respect to the horizontal plane. In an embodiment, the horizontal plane may be considered as a bottom surface of the housing. A seismic sensing unit such as, seismic sensing units 606-1 retractably move towards and away from the opening of housing 604-1.

One or more seismic sensing units 606-$n$ are operated by one or more driving units (not shown in FIG. 6). Thus, the one or more driving units enable the retractable movement of one or more seismic sensing units 606-$n$. In an embodiment, each driving unit of the one or more driving units may include an elongated member connected to a corresponding seismic sensing unit. Accordingly, when one or more seismic sensing units 606-$n$ move towards the opening, a contact is established between one or more seismic sensing units 606-$n$ and the loose surface for acquiring the seismic data. In an embodiment, each seismic sensing unit of one or more seismic sensing units 606-n includes one or more geophones (not shown in FIG. 6) for sensing a plurality of seismic wave signals reflected from a subsurface of the loose surface. The plurality of seismic wave signals may be generated by a seismic wave generator. The seismic wave generator may be located in one or more of one or more apparatuses 602-n. Alternatively, seismic wave generator may be located in a vehicle used for pulling one or more apparatuses 602-n. The mechanism of pulling the one or more apparatuses 602-n using the vehicle is explained in detail below. Further, when the elongated member is pulled, then the seismic sensing unit 606 is pulled back from the opening thereby breaking the contact between the seismic sensing unit 606 and the loose surface. This is explained in detail in conjunction with FIG. 1, FIG. 3 and FIG. 4.

System 600 further includes a connecting member 608 connected to each apparatus of one or more apparatuses 602-n Further, the one or more elongated members may be used to connect each seismic sensing unit to connecting member 608. In an embodiment, one or more coupling units (not shown in FIG. 7) may be used for removably coupling connecting member 608 with the one or more elongated members. Connection between an elongated member and connecting member 608 is further explained in conjunction with FIG. 7. Accordingly, connecting member 608 is pulled to move one or more apparatuses 602-n over the loose surface to perform seismic exploration. When connecting member 608 is pulled, the one or more elongated members are also pulled thereby enabling one or more seismic sensing units 606-n to move away from the corresponding one or more openings of one or more apparatuses 602-n. As a result, one or more seismic sensing units 606-n loses contact with the loose surface. Conversely, connecting member 608 may be pushed or released to enable one or more seismic sensing units 606-n to move towards corresponding openings in respective apparatuses of one or more apparatuses 602-n. At this stage, one or more apparatuses 602-n comes to a stationary state. Moreover, one or more seismic sensing units 606-n establish contact with the loose surface at this stage to acquire seismic data required for seismic exploration.

For example, it may be required to perform seismic exploration over a first location and a second location having loose surface. Accordingly, connecting member 608 is pulled to tow system 600 to the first location. When the connecting member 608 is pulled, one or more elongated members connected to the one or more seismic sensing units and connecting member 608 are also pulled. As a result, the one or more seismic sensing units lose contact with the loose surface. Thereafter, connecting member 608 is released to enable the one or more seismic sensing units to come in contact with the loose surface of the first location. In an embodiment an elastic mechanism may be provided for each of the one or more elongated members to enable the one or more seismic sensing units to retract towards the corresponding one or more openings and come in contact with the loose surface. Subsequent to acquiring seismic data over the first location, connecting member 608 is pulled to tow system 600 to the second location having the loose surface. As explained earlier, one or more seismic sensing units 606-n lose contact with the loose surface while system 600 is being towed. Thereafter, connecting member 608 is released to enable one or more seismic sensing units 606-n to come in contact with the loose surface in the second location to acquire the seismic data.

In an embodiment, connecting member 608 may be connected to a vehicle. Accordingly, the vehicle facilitates towing of one or more apparatuses 602-n. When one or more apparatuses 602-n move on the loose surface, it may be required to maintain a substantially uniform path. Accordingly, in an embodiment, a leveling carriage 610 may be connected to one or more apparatuses of one or more apparatuses 602-n using connecting member 608. Leveling carriage 610 may level the loose surface while moving over the loose surface to create a pathway on the loose surface. As a pathway is created, one or more apparatuses 602-n can conveniently move along a substantially uniform path on the loose surface. Further, the formation of the uniform path on the loose surface enables the one or more apparatuses 602-n to achieve good mobility over the loose surface thereby enabling system 600 to operate with ease.

In an embodiment, leveling carriage 610 may be positioned behind the vehicle and one or more apparatuses 602-n positioned behind leveling carriage 610. In this case, the vehicle may pull leveling carriage 610 and one or more apparatuses 602-n may follow leveling carriage 610 on the loose surface.

Figure 7:
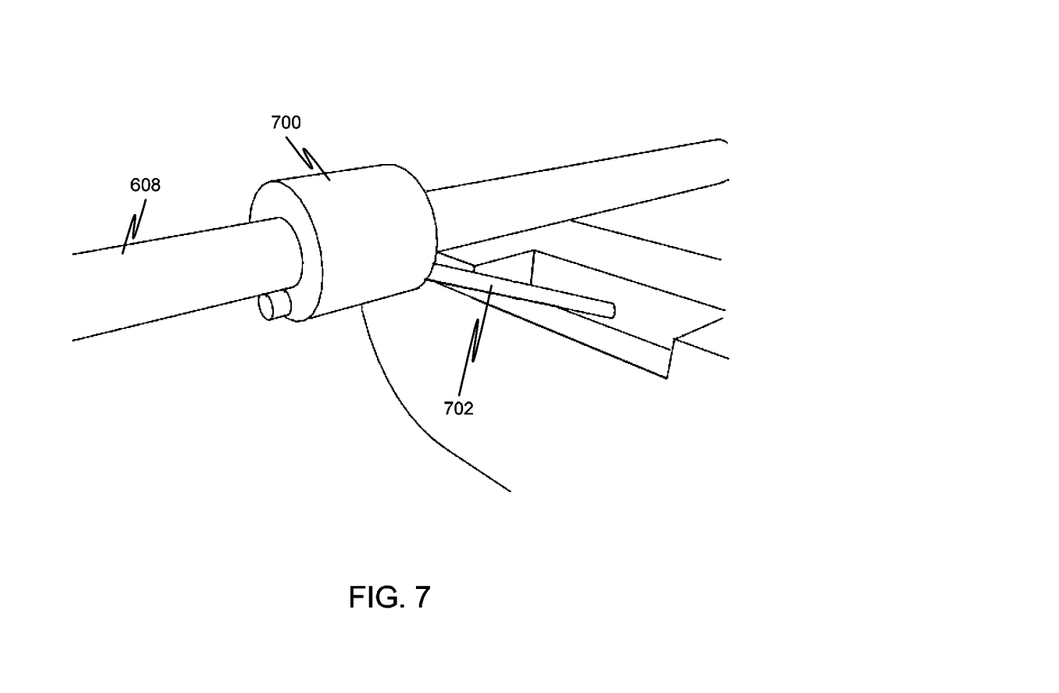
FIG. 7 illustrates a perspective view of a coupling unit for removably coupling connecting member and an elongated member connected to a seismic sensing unit in accordance with an embodiment.

FIG. 7 illustrates a perspective view of a coupling unit 700 used for removably coupling connecting member 608 and an elongated member 702 in accordance with an embodiment. Coupling unit 700 is placed on connecting member 608. In an embodiment, connecting member 608 may be allowed to pass through a first hole (not shown in FIG. 7) on coupling unit 600 for placing coupling unit 600 on connecting member 608. Further, in an embodiment, elongated member 702 may be passed through a second hole on coupling unit 600 for connecting elongated member 702 to coupling unit 600. Accordingly, pulling of connecting member 608 results in pulling of elongated member 702. Thus, a seismic sensing unit (not shown in FIG. 7) connected to elongated member 702 is also pulled away from an opening in a housing where the seismic unit is configured. Thus, the seismic unit moves away from the loose surface. Further, coupling unit 700 as described herein for removably coupling connecting member 608 and an elongated member 702 is according to an embodiment and hence, it may be noted that any other mechanism known in the art may be used to connect connecting member 608 and an elongated member 702.

Figure 8:
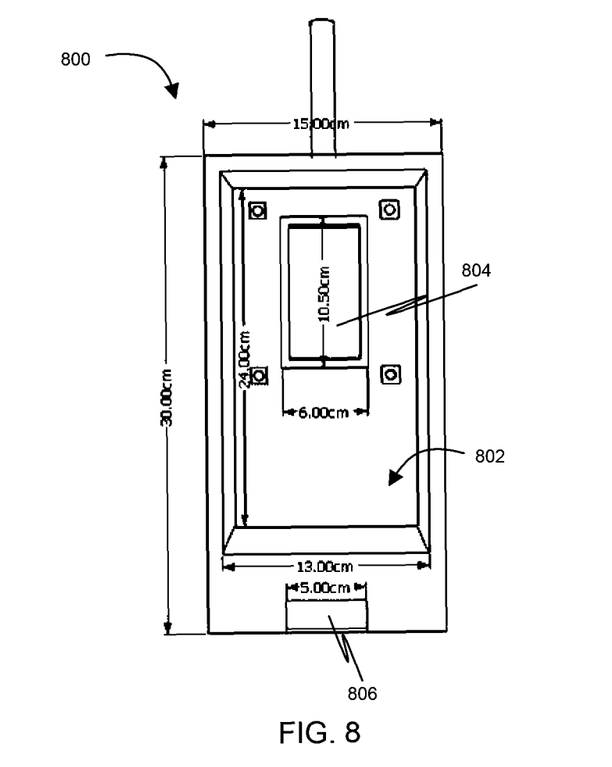
FIG. 8 illustrates a perspective view of a housing capable of moving on a loose surface and receiving a seismic sensing unit (not shown in the figure) in accordance with an exemplary embodiment.

FIG. 8 illustrates a top view of a housing 800 capable of moving on a loose surface and receiving a seismic sensing unit (not shown in FIG. 8) in accordance with an exemplary embodiment. Housing 800 may designed in such a way that it houses the seismic sensing unit conveniently therewithin and enables the seismic sensing unit to operate for gathering seismic data. Accordingly, dimensions of housing 800 are designed to accommodate the seismic sensing unit and for enabling housing 800 to have mobility over the loose surface. Accordingly, the length of housing 800 may be, for example, 30 cm. An enclosure 802 of housing 800 may have dimensions of 24 cm length, 13 cm width and 9 cm height (not shown in FIG. 8). An opening 804 of housing 800 may have dimensions of 10.5 cm length, 6 cm width and 2 cm height (not shown in FIG. 8). Housing 800 is further configured with a groove 806 for receiving a driving unit (not shown in FIG. 8) for operating the seismic unit. Dimensions of groove 806 may be 5 cm length, 2 cm width and 2 cm height (not shown in FIG. 8). A curved surface may be provided for housing 800 in proximity to groove 806. In such a case, the curved surface may have a radius of curvature of 13.62 cm. The curved surface facilitates movement of housing 800 over the loose surface. Further, it may be noted that a housing such as, housing 800 may have any other dimensions that enables the housing to conveniently move over the loose surface.

Figure 9:
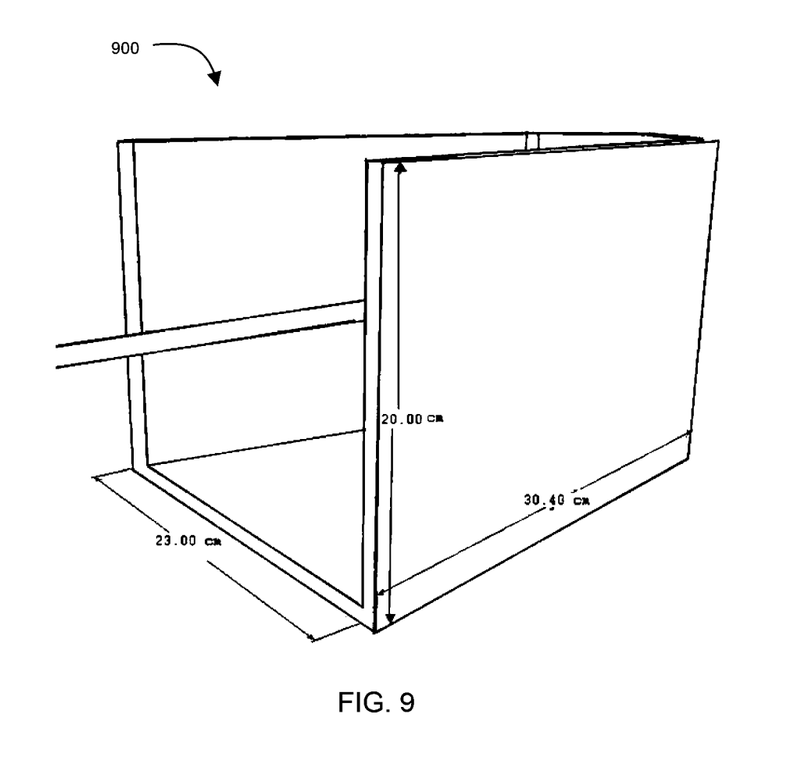
FIG. 9 illustrates a perspective view of a leveling carriage in accordance with an exemplary embodiment.

Moving on to FIG. 9, FIG. 9 illustrates a perspective view of a leveling carriage 900 in accordance with an exemplary embodiment. Leveling carriage may level the loose surface while moving over the loose surface to create a pathway on the loose surface. As a pathway is created, one or more apparatuses for acquiring seismic data can conveniently move along a substantially uniform path on the loose surface. Accordingly, dimensions of leveling carriage 900 are designed to facilitate creation of the pathway on the loose surface. Accordingly, leveling carriage 900 may have dimensions of 20 cm high, 30.41 cm long and 23 cm wide. Further, it may be noted that a leveling carriage such as, leveling carriage 900 may have any other dimensions that enables the housing to conveniently move over the loose surface.

Figure 10:
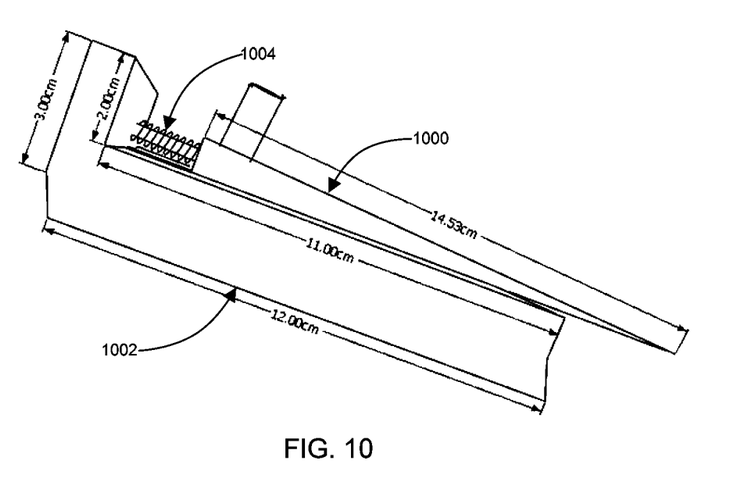
FIG. 10 illustrates a side view of a seismic sensing unit mounted on a supporting unit in accordance with an exemplary embodiment Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Moving on to FIG. 10, FIG. 10 illustrates a side view of a seismic sensing unit 1000 mounted on a supporting unit 1002 in accordance with an exemplary embodiment. Seismic sensing unit 1000 retractably moves towards and away from an opening (not shown in FIG. 10) on a drive channel (not shown in FIG. 10) in supporting unit 1002. Seismic sensing unit 1000 comes in contact with a loose surface to acquire seismic data. Accordingly, seismic sensing unit 1000 is 14.53 cm long as illustrated in FIG. 10. Seismic sensing unit 1000 retractably moves on a top surface of supporting unit 1002. Accordingly, the top surface of supporting unit 1002 has a length of 11 cm. Further, a driving unit 1004 facilitates the retractable movement of seismic sensing unit 1000 as illustrated in FIG. 10. A surface of supporting unit 1002 receiving driving unit 1004 coupled to seismic sensing unit 1000 may be 2 cm high. Further, a surface of supporting unit 1002 in contact with a housing (not shown in FIG. 10) may be 3 cm high. Bottom surface of supporting unit 1002 may be 12 cm long. Further, it may be noted that a seismic sensing unit such as, seismic sensing unit 1000 and a supporting unit such as, supporting unit 1002 may have any other dimensions that enables the seismic sensing unit to retractably move.

Various embodiments of the invention provide an apparatus and a system for acquiring seismic data over a loose surface. Usage of a retractable seismic sensing unit enables acquisition of seismic data to be performed using a minimum number of people for ensuring that the seismic sensing unit is properly coupled or is in contact with the loose surface. Since, a seismic sensing unit is in a position away from the loose surface during towing of the system, wearing of the seismic sensing unit is minimized. Further, due the retractable movement of the seismic sensing unit, the apparatus is capable of gathering the seismic data accurately. In this case, the seismic sensing unit also establishes a proper contact with the loose surface for gathering the seismic data. As a proper contact is established, the seismic sensing unit receives a major portion of the plurality of seismic wave signals reflected from the subsurface of the loose surface.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. An apparatus for acquiring seismic data over a loose surface, the apparatus comprising:
    a housing capable of moving on the loose surface, the housing having an opening configured at a bottom surface of the housing;
    a seismic sensing unit configured within the housing at an angle with respect to a horizontal plane,
    wherein the seismic sensing unit is operable to retractably move towards and away from the opening within the housing, whereby in response to moving towards the opening, the seismic sensing unit establishes contact with the loose surface for acquiring the seismic data;
    a supporting unit removably attached to the bottom portion of the housing, the supporting unit having the seismic sensing unit moveably mounted thereon; and
    a drive channel configured on the supporting unit, wherein the seismic sensing unit is movably mounted on the drive channel for facilitating the retractable movement of the seismic sensing unit.

2. The apparatus of claim 1 further comprising a driving unit to operate the seismic sensing unit for performing the retractable movement.

3. The apparatus of claim 2 wherein the driving unit comprises an elongated member connected to the seismic sensing unit, wherein the elongated member is manipulated to facilitate the retractable movement of the seismic sensing unit.

4. The apparatus of claim 1, wherein the seismic sensing unit comprises:
    at least one geophone for sensing a plurality of seismic wave signals reflected from a subsurface corresponding to the loose surface to acquire the seismic data; and
    a base unit, wherein the at least one geophone is mounted on the base unit.

5. The apparatus of claim 1 further comprising an elastic mechanism coupled to a portion of the elongated member, wherein the elastic mechanism facilitates the retractable movement of the seismic sensing unit.

6. The apparatus of claim 5, wherein the elastic mechanism is one of a spring mechanism, a rubber based mechanism, and a resin based mechanism.

7. A system for performing seismic exploration over a loose surface, the system comprising:
    at least one apparatus for acquiring seismic data over the loose surface, wherein each apparatus of the at least one apparatus comprises:
    a housing capable of moving on the loose surface, wherein the housing has an opening configured at a bottom surface of the housing;
    a seismic sensing unit configured within the housing at an angle with respect to a horizontal plane,
    wherein the seismic sensing unit is operable to retractably move towards and away from the opening within the housing, whereby in response to moving towards the opening, the seismic sensing unit establishes contact with the loose surface for acquiring the seismic data;
    a connecting member connected to each apparatus of the at least one apparatus, wherein the connecting member is pulled to move the at least one apparatus over the loose surface to perform seismic exploration;
    a supporting unit removably attached to the bottom portion of the housing, the supporting unit having the seismic sensing unit mounted thereon; and a drive channel configured on the supporting unit, wherein the seismic sensing unit is movably mounted on the drive channel for facilitating the retractable movement of the seismic sensing unit.

8. The system of claim 7, wherein a seismic sensing unit of each apparatus comprises:
at least one geophone for sensing a plurality of seismic wave signals reflected from a subsurface corresponding to the loose surface to acquire the seismic data; and
a base unit, wherein the at least one geophone is mounted on the base unit.

9. The system of claim 7, wherein the each apparatus of the at least one apparatus further comprises a driving unit to operate the seismic sensing unit for performing the retractable movement.

10. The system of claim 9, wherein the driving unit comprises an elongated member connected to the seismic unit, wherein the elongated member is manipulated to facilitate the retractable movement of the seismic sensing unit.

11. The system of claim 10, wherein the each apparatus further comprises an elastic mechanism coupled to a first portion of the elongated member, wherein the elastic mechanism facilitates the retractable movement of the seismic sensing unit.

12. The system of claim 11, wherein the elastic mechanism is one of a spring mechanism, a rubber based mechanism, and a resin-based mechanism.

13. The system of claim 10, wherein the elongated member is operably coupled to the connecting member.

14. The system of claim 13, wherein the connecting member is:
pulled to move the at least one apparatus from a first location to a second location, thereby pulling an elongated member connected to a seismic sensing unit of each apparatus of the at least one apparatus to facilitate the seismic sensing unit to move away from a corresponding opening of the each apparatus and lose contact with the loose surface at the first location; and
released in response to moving the at least one apparatus to the second location, whereby upon releasing the connecting member, the elongated member facilitates the seismic sensing unit to move towards the corresponding opening and establish contact with the loose surface at the second location.

15. The system of claim 7, wherein the connecting member is connected to a vehicle, the vehicle capable of pulling the connecting member to move the at least one apparatus over the loose surface.

16. The system of claim 7 further comprising a leveling carriage connected to the at least one apparatus using the connecting member, wherein the leveling carriage along with the at least one apparatus moves on the loose surface in response to pulling the connecting member.

* * * * *